(12) United States Patent
Rosikiewicz et al.

(10) Patent No.: US 8,682,862 B2
(45) Date of Patent: Mar. 25, 2014

(54) VIRTUAL MACHINE FILE-LEVEL RESTORATION

(75) Inventors: James Rosikiewicz, Stockton, NJ (US); Calab K. Shay, Bushkill, PA (US); Ronald T. McKelvey, Morris Plains, NJ (US); Alexander D. Mittell, Cedar Knolls, NJ (US)

(73) Assignee: PHD Virtual Technologies Inc., Mount Arlington, NJ (US)

( * ) Notice: Subject to any disclaimer, the term of this patent is extended or adjusted under 35 U.S.C. 154(b) by 313 days.

(21) Appl. No.: 12/758,326

(22) Filed: Apr. 12, 2010

(65) Prior Publication Data

US 2010/0262585 A1 Oct. 14, 2010

Related U.S. Application Data

(60) Provisional application No. 61/168,315, filed on Apr. 10, 2009, provisional application No. 61/168,318, filed on Apr. 10, 2009, provisional application No. 61/172,435, filed on Apr. 24, 2009.

(51) Int. Cl.
*G06F 17/30* (2006.01)

(52) U.S. Cl.
USPC .......................................... 707/679

(58) Field of Classification Search
USPC .......................................... 707/679
See application file for complete search history.

(56) References Cited

U.S. PATENT DOCUMENTS

| | | | |
|---|---|---|---|
| 6,629,110 B2 | 9/2003 | Cane et al. | |
| 6,745,192 B1 * | 6/2004 | Libenzi ................................ 1/1 |
| 6,865,655 B1 | 3/2005 | Anderson | |
| 6,871,271 B2 | 3/2005 | Ohran et al. | |
| 6,912,645 B2 | 6/2005 | Dorward et al. | |
| 6,948,039 B2 | 9/2005 | Biessner et al. | |
| 7,093,086 B1 | 8/2006 | Van Rietschote | |
| 7,107,486 B2 | 9/2006 | Okada et al. | |
| 7,134,041 B2 | 11/2006 | Murray et al. | |
| 7,152,078 B2 | 12/2006 | Yamagami | |
| 2005/0060609 A1 | 3/2005 | El-Batal et al. | |
| 2006/0026219 A1 * | 2/2006 | Orenstein et al. ............. 707/204 |
| 2006/0064444 A1 | 3/2006 | van Ingen et al. | |
| 2006/0075294 A1 | 4/2006 | Ma et al. | |
| 2007/0083722 A1 | 4/2007 | Per et al. | |
| 2007/0094316 A1 * | 4/2007 | Rodriguez et al. ............. 707/205 |
| 2007/0208918 A1 | 9/2007 | Harbin et al. | |
| 2008/0104146 A1 * | 5/2008 | Schwaab et al. ............. 707/204 |
| 2009/0006888 A1 * | 1/2009 | Bernhard et al. ................. 714/6 |
| 2010/0049930 A1 | 2/2010 | Pershin et al. | |

* cited by examiner

*Primary Examiner* — Rehana Perveen
*Assistant Examiner* — Alexander Khong
(74) *Attorney, Agent, or Firm* — Carter, DeLuca, Farrell & Schmidt, LLP (57) ABSTRACT

Disclosed is a method and system for selectively restoring file-level data from a disk image backup. In embodiments, a virtual machine backup may be performed by dividing a virtual machine virtual disk file into a plurality of discrete fixed-sized data blocks sharing a common index file that is stored on a backup medium, such as a hard drive, to form a backup set. The index file is referenced to determine which fixed-sized block contains volume information, such as a partition table, of the backed-up virtual machine file. The individual blocks are processed as a virtual filesystem which is mounted and presented to an access module, which traverses the filesystem and provide access to individual files in the image backup to a client process. The restore files may be delivered to the client in a container file, which may be compressed to increase transfer speed. The container file may include executable instructions for automatically restoring the files to a desired location.

27 Claims, 5 Drawing Sheets

VIRTUAL MACHINE FILE-LEVEL RESTORATION

CROSS REFERENCE TO RELATED APPLICATIONS

The present application claims the benefit of and priority to U.S. Provisional Application Ser. No. 61/168,315, filed on Apr. 10, 2009, entitled "VIRTUAL MACHINE DATA BACKUP"; U.S. Provisional Application Ser. No. 61/168,318, filed on Apr. 10, 2009, entitled "VIRTUAL MACHINE FILE-LEVEL RESTORATION"; and U.S. Provisional Application Ser. No. 61/172,435, filed on Apr. 24, 2009, entitled "VIRTUAL MACHINE DATA REPLICATION"; the entirety of each are hereby incorporated by reference herein for all purposes.

BACKGROUND

1. Technical Field

The present disclosure relates to computer data backup, and in particular, to a system and method for performing block-level backups of virtual machine, wherein backed up data is stored in de-duplicated form in a hierarchical directory structure.

2. Background of Related Art

Continuing advances in storage technology allow vast amounts of digital data to be stored cheaply and efficiently. However, in the event of a failure or catastrophe, equally vast amounts of data can be lost. Therefore, data backup is a critical component of computer-based systems. As used herein, the term "backup" may refer to the act of creating copies of data, and may refer to the actual backed-up copy of the original data. The original data typically resides on a hard drive, or on an array of hard drives, but may also reside on other forms of storage media, such as solid state memory. Data backups are necessary for several reasons, including disaster recovery, restoring data lost due to storage media failure, recovering accidentally deleted data, and repairing corrupted data resulting from malfunctioning or malicious software.

A virtual machine (VM) is a software abstraction of an underlying physical (i.e., hardware) machine which enables one or more instances of an operating system, or even one or more operating systems, to run concurrently on a physical host machine. Virtual machines have become popular with administrators of data centers, which can contain dozens, hundreds, or even thousands of physical machines. The use of virtual servers greatly simplifies the task of configuring and administering servers in a large scale environment, because a virtual machine may be quickly placed into service without incurring the expense of provisioning a hardware machine at a data center. Virtualization is highly scalable, enabling servers to be allocated or deallocated in response to changes in demand. Support and administration requirements may be reduced because virtual servers are readily monitored and accessed using remote administration tools and diagnostic software.

In one aspect, a virtual server consists of three components. The first component is virtualization software configured to run on the host machine which performs the hardware abstraction, often referred to as a hypervisor. The second component is a data file which represents the filesystem of the virtual machine, which typically contains the virtual machine's operating system, applications, data files, etc. A virtual machine data file may be a hard disk image file, such as, without limitation, a Virtual Machine Disk Format (VMDK) format file. Thus, for each virtual machine, a separate virtual machine file is required. The third component is the physical machine on which the virtualization software executes. A physical machine may include a processor, random-access memory, internal or external disk storage, and input/output interfaces, such as network, storage, and desktop interfaces (e.g., keyboard, pointing device, and graphic display interfaces.)

Virtual machine files may be backed up as images, or replications of the complete virtual machine file. Such backup schemes may logically divide and store the virtual machine file into a number of smaller logical blocks which, taken together, constitute a "snapshot" of an entire filesystem as it existed at the time the backup was performed. While such systems are well-suited for restoring an entire filesystem, such systems may have drawbacks, for example, if it is desired to restore a subset of the filesystem, such as an individual file, or a single directory, or an arbitrary collection of files and/or directories, from the backup. A backup system which performs virtual server backups with increased efficiency and effectiveness while permitting the restoration of individual files, folders, and backup subsets would be a welcome advance.

SUMMARY

The present disclosure is directed to a method of performing file level restoration of a volume level backup set, or archive. In one embodiment, the backup set includes a plurality of fixed-sized blocks representative of a virtual machine file (e.g., a virtual disk file and/or a VMDK file) and an index file indicative, at least in part, of the positions of the individual fixed-size blocks within the archive. Such a backup is described in the commonly-owned, concurrently-filed U.S. patent application Ser. No. 12/758,245 entitled "VIRTUAL MACHINE DATA BACKUP", the entirety of which is hereby incorporated by reference herein for all purposes. The index file is consulted to determine which fixed-sized datablock(s) include filesystem information, e.g., a file allocation table (FAT), a master file table (MFT), and the like, of the backed-up virtual machine file. An offset, or pointer, into the fixed-sized datablock(s) may be established to define a position within the fixed-sized datablock(s) at which the filesystem information resides.

The disclosed method processes 1 MB fixed-length blocks of data of a virtual machine file. A MD5 hash is created for this block data. The 1 MB of data can be compressed, or left uncompressed. The 1 MB of data is stored as a single file. The file name is the MD5 hash value of the 1 MB data block. The hash of this file is saved to a separate index file for later use to retrieve, validate, and rebuild the backup data. The data blocks, whether in compressed or uncompressed form, are stored at a storage destination, in a unique directory structure consisting of 256 first level directories designated as 00-FF, each having 256 second level directories designated as 00-FF within, comprising 65,536 directories in total. The 1 MB compressed (or uncompressed) data files are stored in the directory structure based on the first four bytes of the hash, e.g., "./00/22/T.002249a8a218ef8a4da87550f388942d.gz".

The first four bytes of data for the file name are "0022". The file is stored in directory "./00/22/". The .gz extension indicates the file is compressed.

Subsequent backups are performed having as a destination the same storage location. Data blocks are generated using the above unique hash. A file query is made to the storage location to see if there is already a file existing with the same hash. If the file does not exist, the source data is written into the directory hierarchy with the hash as the file name and an index file is updated. If the file exists, then only the index file is updated for the current backup being run.

Over time the directory structure will accumulate data blocks from all backups sent thereto. A separate index file is created for each backup, and is used to keep track of the blocks of data for, e.g., re-assembling data block of the original source during restoration.

The use of a hash also provides a self-checking mechanism which enables self-validation of the data within the stored file. A routine is scheduled to run on an ad-hoc or periodic basis that reads the data within a stored file, and validates the data in the file to verify a match to the hash file name. If the data does not match, the block is considered suspect, and is slated to be deleted. All associated backups that include this data block are flagged as "bad". The index file corresponding to backups so flagged may additionally or alternatively include a "bad" flag.

In an embodiment, the data blocks (e.g., the 1 MB data blocks) may be evaluated to determine whether the data contained therein exhibits a predefined ("special") data pattern. For example with limitation, a special data pattern may include a particular or repeating pattern, e.g., a data block consisting entirely of zero (00H) bytes. In this instance, a special hash is generated that represents the special data block containing the particular data pattern. The special hash may be hard-coded, defined in a database, and/or defined in a configuration file. Since the contents of a special data block is predefined, it is only necessary to record the fact that the data block is special. It is unnecessary to store the actual contents of a special block. Thus, for each data block identified as special, the index file is updated accordingly and the backup proceeds. In this manner, resources are conserved since special blocks, e.g., null blocks, do not consume space on the storage device, do not use communication bandwidth during backup and restoration procedures, do not require as much computational resources, and so forth. This provides a quick and easy way to skip special (e.g., null) data in a given backup set.

During restoration, the fixed-sized datablock(s) are piped through a virtual filesystem component, such as without limitation, a Filesystem in Userspace (FUSE) driver. The virtual filesystem driver presents the filesystem of the backup set to an access module, which may traverse the filesystem and provide access to the backed-up files to a client process. It is envisioned that a client process may include a web (e.g., HTTP-based) interface, however, other client processes are contemplated within the scope of the present disclosure, including without limitation an automated agent, a command line (shell) process, a remote procedure call (RPC), a remote mounting client (NFS, SMB), and a database.

In embodiments, the access module may provide access to a plurality of available backup sets. For example, multiple backup sets of a particular virtual machine, taken at successive points in time, may be accessed by the access module. Access to backup sets of multiple virtual machines, clustered machines, and the like are also contemplated within the scope of the present disclosure. The disclosed method may sequentially, randomly, or concurrently process data blocks to service more than one client request at a time.

A user interface in accordance with the present disclosure may include links to backup sets, directories, files, and other logical groupings of restorable data. In an embodiment, the user interface is web-based (e.g., employs a web browser capable of communicating using the hypertext transfer protocol, a.k.a. HTTP, and the like.) Activation of a link may present hierarchical information, e.g., clicking on a backup link may reveal the contents of the subject backup; clicking on a directory (folder) link may present the contents thereof, and clicking on a file link may initiate a file transfer of the subject file to the client machine. Additionally or alternatively, clicking on a folder may initiate a file transfer of the contents of the folder to the client machine. Other forms of delivery are contemplated, for example, multiple selections of backup data.

In an embodiment, the file transfer may include an aggregation step wherein the file(s) are aggregated in a single container file for transfer, e.g., requested files may be included in a .ZIP file for efficient and convenient transfer to the client. Also envisioned is a container file that includes executable instructions for automatically moving files to their original location within the target filesystem.

In yet another aspect, a method of data restoration in accordance with present disclosure includes retrieving a logical data unit stored within a backup set represented by at least one backup data block, and an index file. The disclosed method includes the steps of identifying a backup data block containing information indicative of the logical organization of the backup set. At least one logical data unit stored within the backup set is identified. At least one identified logical data unit is selected, and the selected logical data unit is transferred to a recipient.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In the discussion contained herein, the terms user interface element and/or button are understood to be non-limiting, and include other user interface elements such as, without limitation, a hyperlink, clickable image, and the like.

Additionally, the present invention may be described herein in terms of functional block components, code listings, optional selections, page displays, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed by any computer having an Internet Web Browser, on a variety of operating systems including Windows, Macintosh, and/or Linux.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

Figure 1:
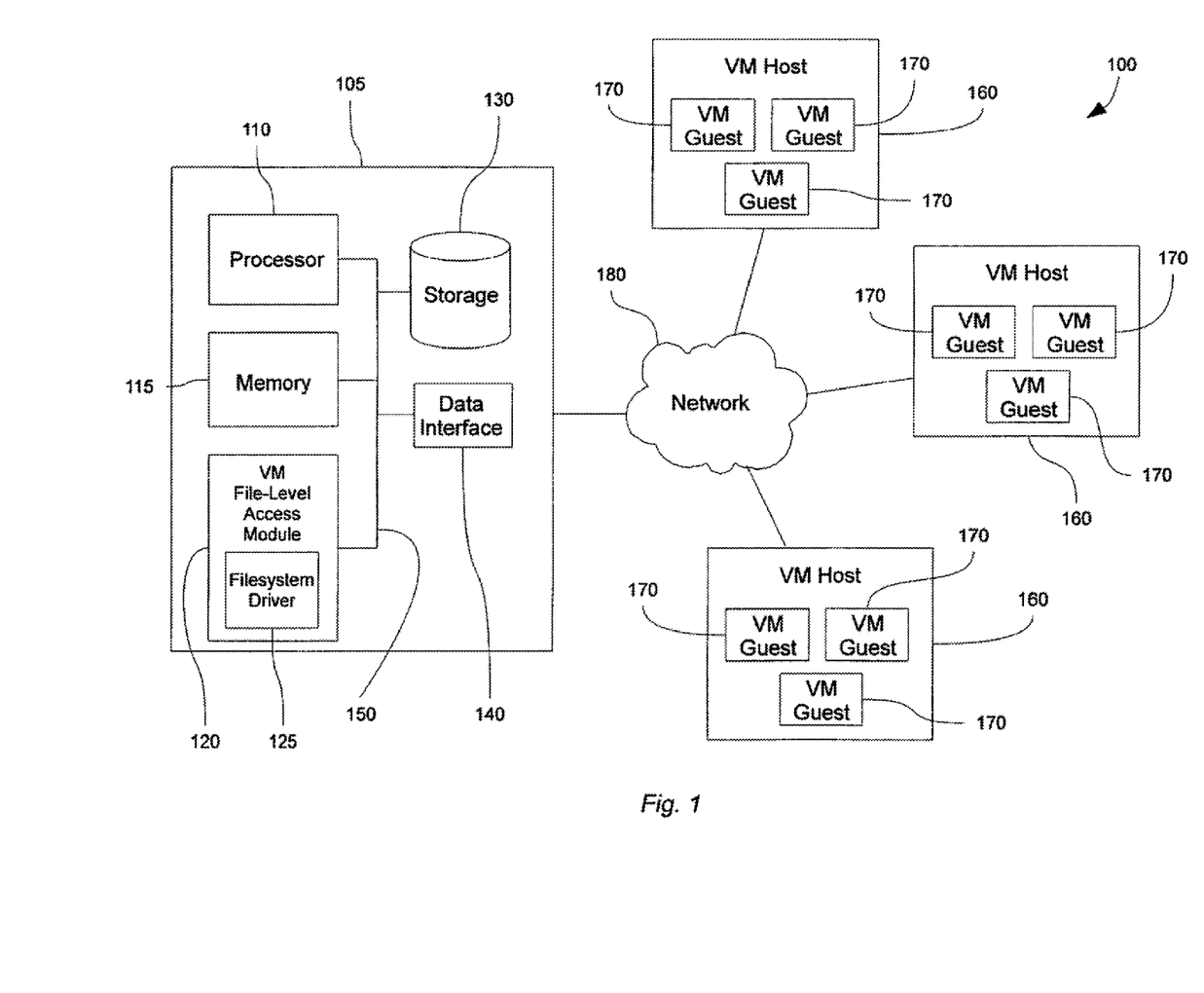
FIG. 1 shows a block diagram of an embodiment of a virtual machine backup system in accordance with the present disclosure.

FIG. 1 illustrates a representative operating environment 100 for an example embodiment of a virtual machine backup system 105 having the capability to perform a file-level restoration in accordance with the present disclosure. Representative operating environment 100 includes virtual machine backup system 105 which can be a personal computer (PC) or a server, which further includes at least one system bus 150 which couples system components, including at least one processor 110; a system memory 115 which may include random-access memory (RAM); at least one storage device 130, such as without limitation one or more hard disks, CD-ROMs or DVD-ROMs, or other non-volatile storage devices, such as without limitation flash memory devices; and a data network interface 140. System bus 150 may include any type of data communication structure, including without limitation a memory bus or memory controller, a peripheral bus, a virtual bus, a software bus, and/or a local bus using any bus architecture such as without limitation PCI, USB or IEEE 1394 (Firewire). Data network interface 140 may be a wired network interface such as a 100Base-T Fast Ethernet interface, or a wireless network interface such as without limitation a wireless network interface compliant with the IEEE 802.11 (i.e., WiFi), GSM, or CDMA standard.

Virtual machine backup system 105 may be operated in a networked environment via data network interface 140, wherein system 105 is connected to one or more virtual machine hosts 160 by a data network 180, such as a local area network or the Internet, for the transmission and reception of data, such as without limitation backing up and restoring virtual machine data files as will be further described herein. Each of the one or more virtual machine hosts 160 may include one or more virtual machines 170 operating therein, as will be appreciated by the skilled artisan.

Virtual machine backup system 105 includes a virtual machine file-level access module 120 that is configured to perform a method of file restoration as described herein. The access module 120 includes a virtual filesystem driver module 125 having the capability to logically access a set of datablocks, such as without limitation a backup set, via the native filesystem of source virtual machine from which the backup set is derived. In an embodiment, virtual filesystem driver module 125 includes a filesystem in userspace (FUSE) software component. In an embodiment, access module 120 includes a set of programmable instructions adapted to execute on processor 100 for performing the method of virtual machine file-level restoration disclosed herein.

The present disclosure provides a method for restoring files from a virtual machine image backup. The virtual machine image backup may include a plurality of fixed-size data blocks representative of corresponding blocks of the source virtual machine file, and an index file that may include, without limitation, a list of data blocks, a unique identifier (e.g., a hash value) that uniquely identify a data block, date and time of backup, and source and destination locations.

Figure 2:
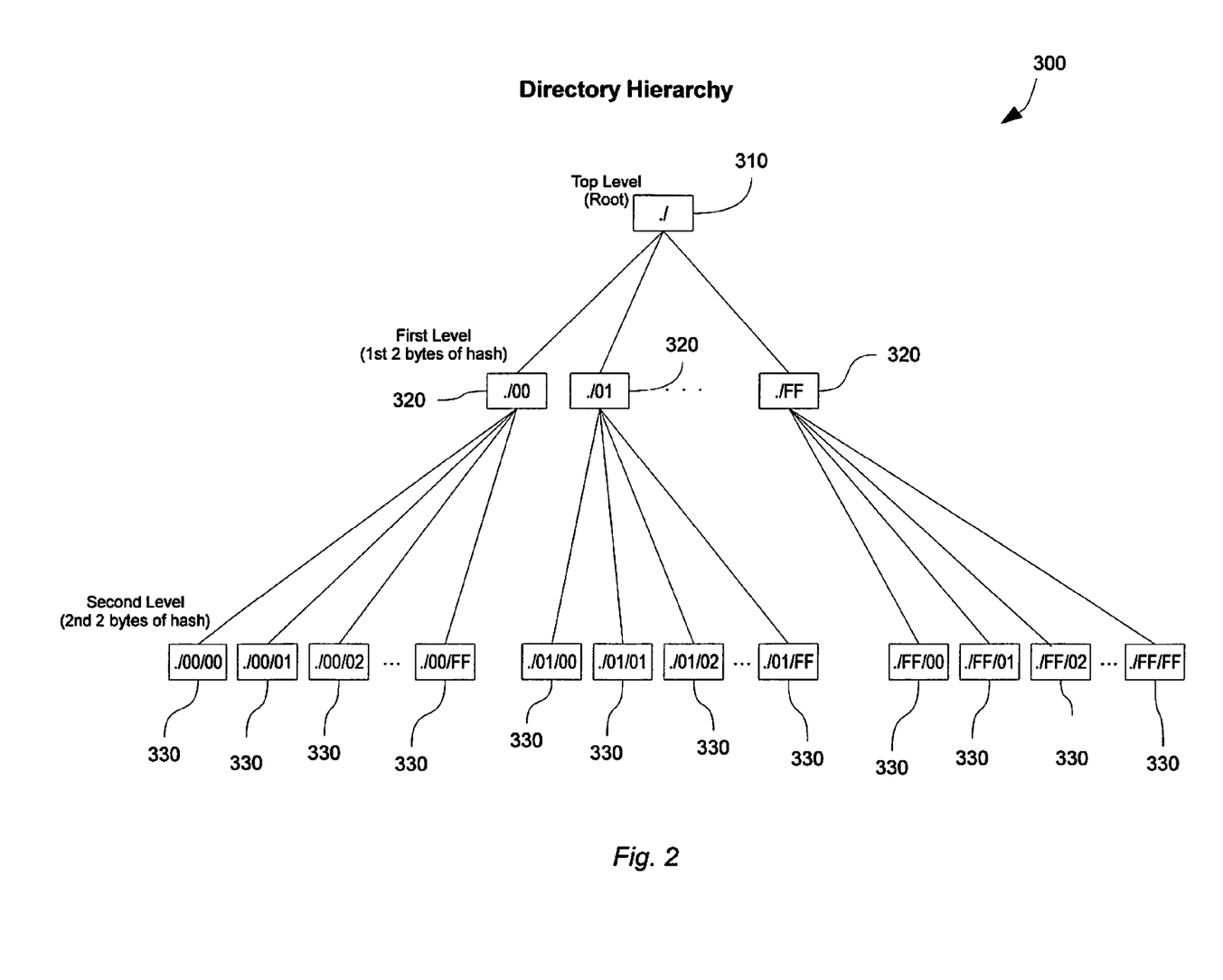
FIG. 2 is a block diagram illustrating a directory hierarchy of an embodiment of a virtual machine backup in accordance with the present disclosure.
Figure 3:
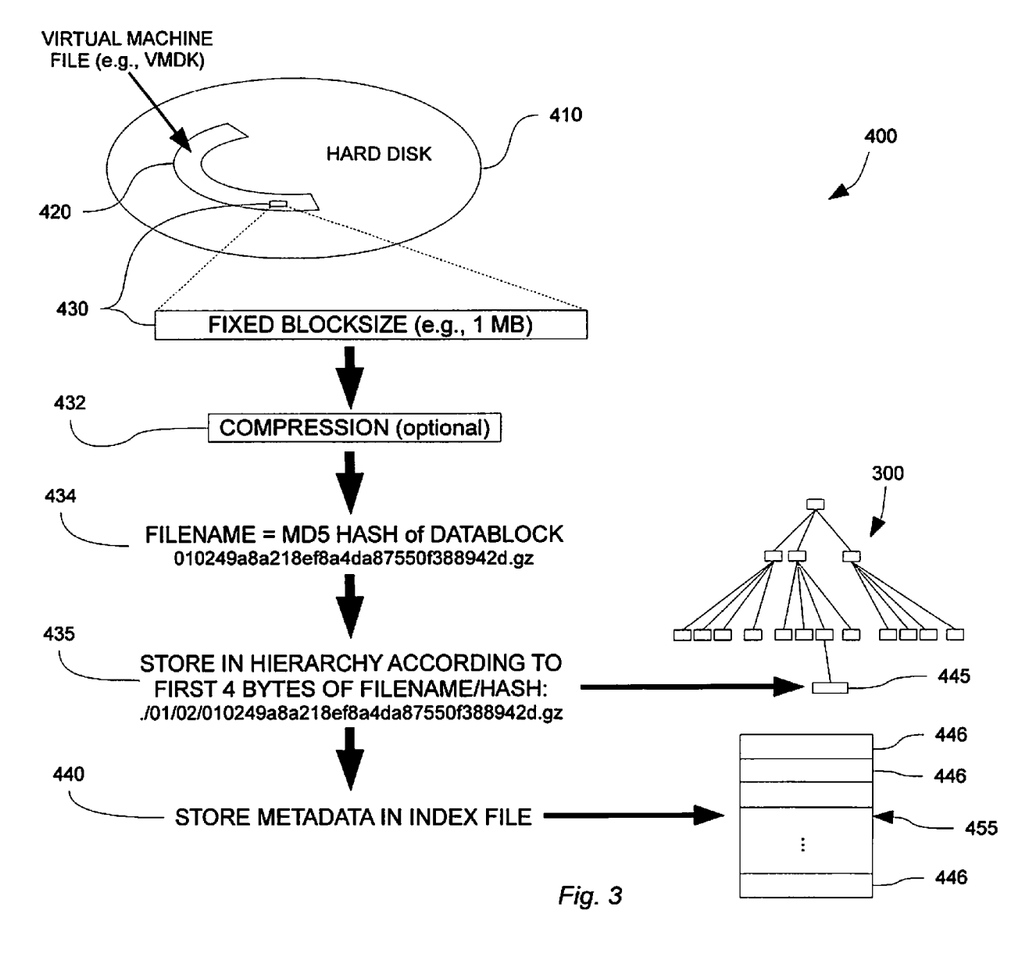
FIG. 3 is a flow diagram of an embodiment of a virtual machine backup in accordance with the present disclosure.

Referring to FIGS. 2 and 3, a virtual machine file 420 slated for backup may be stored on a storage device, such as without limitation, hard disk 410. While it is contemplated that hard disk 410 may be included within a virtual machine host, is it to be understood that a virtual machine file 420 may be stored on a hard disk array, such as a storage-area network (SAN), a redundant array of independent disks (RAID), network-attached storage (NAS) and/or on any storage medium now or in the future known.

The virtual machine file 420 is logically divided into a number of fixed-length blocks 430 of like size. In one embodiment, a blocksize of 1 MB is used, however, it is to be understood that a blocksize of less than 1 MB, or greater than 1 MB, may be used within the scope of the disclosed method. In one aspect, the blocksize is determined at least in part by a correlation between performance and blocksize. Other parameters affecting blocksize may include, without limitation, a data bus speed, a data bus width, a virtual machine file size, a processor speed, a storage device bandwidth, and a network throughput. If a virtual machine does not precisely equal a multiple of a chosen fixed blocksize, the remainder may be padded with e.g., zeros, nulls, or any other fill pattern, to achieve a set of equal-sized blocks.

An individual backup data file 445 is created from each fixed-length block 430 of the virtual machine file 420. In an embodiment, individual backup data file 445 may be given a temporary filename, and/or stored in a temporary location, e.g., /var/tmp/block000001.dat. A hash is generated according to the contents of each individual backup data file. In an embodiment, a 4,096 bit MD5 hash is used to create the hash value from the contents thereof. The resultant hash value is stored in an index file corresponding to the current backup session which store for later use during, e.g., data restoration. The index file may include, without limitation, a list of data blocks comprising the backup set, hash values corresponding thereto, a date and time of backup, a source location, and a destination location. A collection of hash values representative of a backup of virtual machine file, and data associated therewith, may be stored in an index file 455. Such a collection, together with the individual backup data files comprising the backed-up virtual machine file 420 is known as a "backup set."

Additionally or alternatively, the data block 430 may be compressed during a compression step 432 using any suitable manner of data compression, including without limitation, LZW, zip, gzip, rar, and/or bzip. Preferably, lossless data compression is used however in certain embodiments lossy data compression may advantageously be used.

The hash value may be regarded as a unique block identifier, or a unique identifier of a backup data file 455. A non-temporary ("archival") filename of the backup data file may be generated, at least in part, from the hash value, as illustrated in step 434. For example, the filename of a backup data file 455 may be created by appending a hexadecimal representation of the hash value to a file prefix and/or to an appropriate file extension. Each backup data file 455 comprising the virtual machine file therefore has a unique filename based upon the hash value.

A hierarchical directory structure 300 is provided on a backup storage device, e.g., storage device 130, for storing the backup data files. The disclosed structure has at a first level thereof a plurality of directories 320 et seq. (e.g., folders). Each first level directory contains therein a plurality of second level directories 330. In an embodiment, the hierarchy includes 256 first level directories, wherein each first level directory includes 256 second level directories, for a total number of 65,536 directories. The first level and second level directories may be named in accordance with a sixteen bit hexadecimal value, e.g., 00-FF. Thus, for example, a plurality of first level directories may be named in accordance with the series ./00, ./01, ./02 . . . ./FF while a second level of directories may be named./00/01, ./00/02/ . . . ./00/FF. Other directory mapping schemes are envisioned within the scope of the present disclosure, such as without limitation, a directory hierarchy having fewer than two levels, a directory hierarchy having greater than two levels, a directory hierarchy having a directory naming convention that includes fewer than a sixteen bit hexadecimal value, a directory hierarchy having a directory naming convention that includes greater than a sixteen bit hexadecimal value, and/or a directory hierarchy having a directory naming convention that includes an alternative naming encoding, such as octal, ASCII85, and the like.

Figure 4:
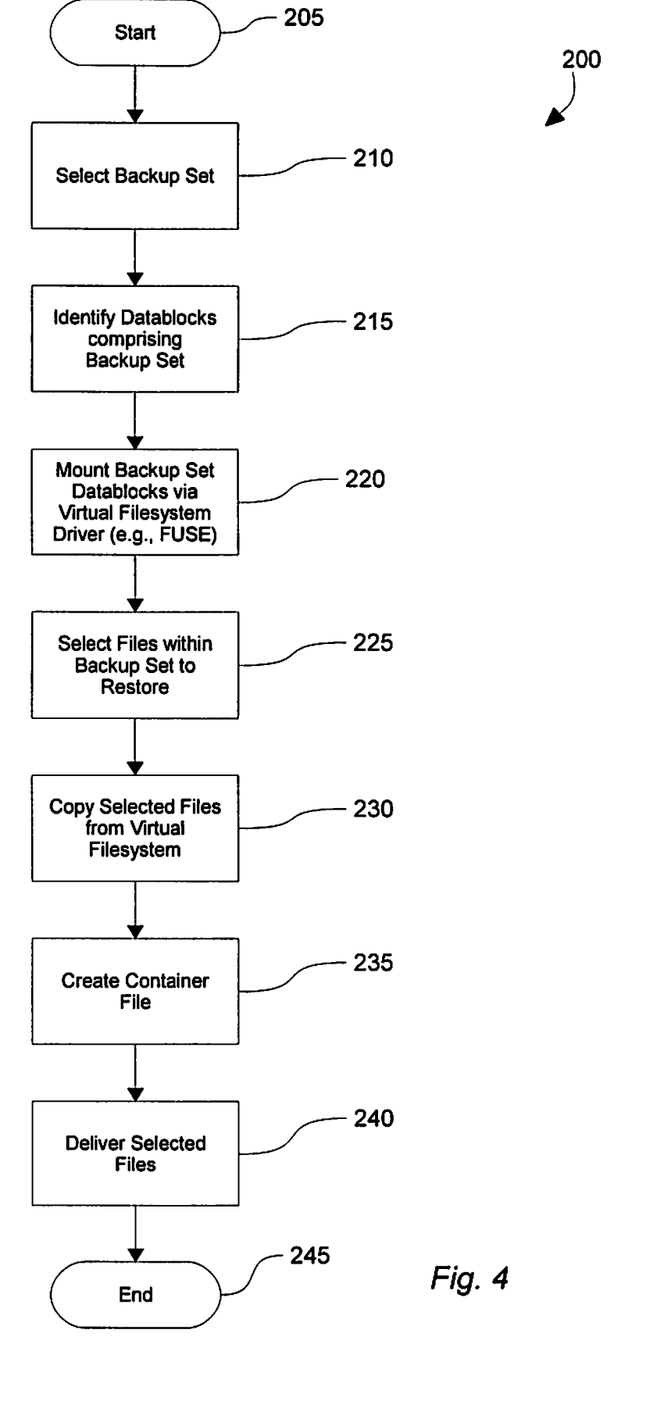
FIG. 4 is a flowchart of an embodiment of a virtual machine backup method in accordance with the present disclosure.
Figure 5:
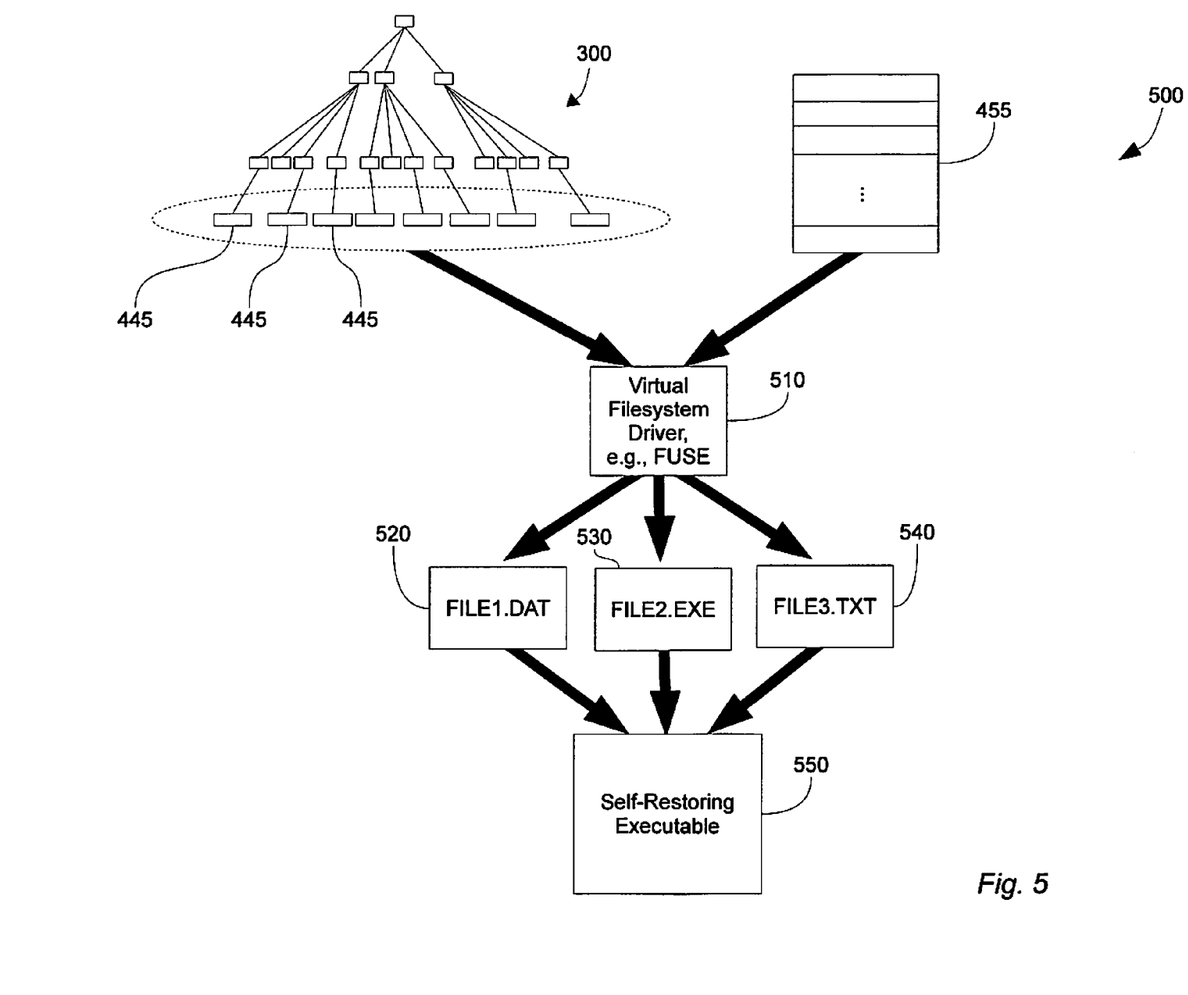
FIG. 5 illustrates a block diagram of a virtual machine backup system in accordance with the present disclosure.

With reference to FIGS. 4 and 5, the disclosed method of performing a file-level restoration 200 starts with the step 205, which may include initialization, housekeeping, resource allocation (e.g., memory allocation, opening I/O channels), and the like. In the step 210, a desired backup set is selected from one or more previously-created backup sets. In one non-limiting example, a user may choose a desired backup set based upon selection criteria such as date and time of backup (e.g., a timestamp), a source virtual machine (e.g., the machine from which the backup was created), a file contained therein, contents of a file contained therein, and the like. In step 215, a set of data blocks 445 which comprise a selected backup set are identified. In an embodiment, an index file 455 may be consulted to perform the identification of data blocks stored within a directory hierarchy 300 that comprise a desired backup set. At least one datablock 445 that includes, for example, volume information, such as a partition table, file allocation table, a master boot record, and the like, may be identified in step 215. In the step 220 the identified datablocks are mounted as a virtual filesystem, using, for example, a Filesystem in Userspace (FUSE) driver 510 or the like. The virtual filesystem driver 510 processes volume information contained within the data block, and/or processes block identification information stored within the index file, to obtain information relating to the content of the backup set. In particular, available logical units of data, such as directories and files that are contained within the backed-up filesystem are identified. In the step 225, the available files are presented to a client, which may be e.g., a user via a user interface and/or a client process via an application programming interface (API). At least one backed-up file contained within the backup set is selected by the client process for restoration. Advantageously, the virtual filesystem driver 510 enables the client (user) to browse the filesystem of the backup set to facilitate the selection of backed-up filed for restoration. In the step 230, the virtual filesystem driver reads the backup data blocks corresponding to the selected file(s) to reconstruct the selected file(s) for restoration. By way of non-limiting example only, the reconstructed files are represented by "file1.dat" 520, "file2.exe" 530, and/or "file3.txt" 540. The reconstructed file(s) for restoration are delivered to the client in the step 240.

Optionally or alternatively, in the step 235 the reconstructed files "file1.dat" 520, "file2.exe" 530, and "file3.txt." 540 etc. may be aggregated (e.g., combined into a container file) and/or compressed (e.g., into a .zip file.) In an envisioned embodiment, a container file may be a self-restoring file 550 that includes a set of executable instructions configured to perform at least one of decompressing the files contained within the container file, and copying the files contained within the container file to a predetermined destination. The self-restoring file may provide a user interface configured to accept at least one user input indicative of a destination location, and to cause the self-restoring file to perform the indicated restoration with further input from the user, and/or without requiring additional software components. For example, and without limitation, a destination location other than the original source location of the file(s) to be restored may be specified.

The present disclosure is also directed to a computer-based apparatus and a computing system configured to perform a method of data restoration as described herein. Also disclosed is computer-readable media comprising a set of instructions of performing a method of data restoration as described herein.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. The claims can encompass embodiments in hardware, software, or a combination thereof. Those skilled in the art will envision other modifications within the scope and spirit of the claims appended hereto.

What is claimed is:

1. A method for retrieving a logical data unit stored within a deduplicated disk image residing on a backup storage device without restoring the entire deduplicated disk image, comprising:

receiving a request for at least one deduplicated disk image residing on a backup storage device;

identifying the at least one deduplicated disk image residing on the backup storage device based on information contained within an index file, which is indicative of a logical organization of the backup storage device;

mounting the at least one deduplicated disk image;

receiving a request for at least one logical data unit stored within the at least one deduplicated disk image;

identifying a portion of the at least one deduplicated disk image that corresponds to the at least one requested logical data unit without restoring the entire at least one deduplicated disk image;

restoring only the portion of the at least one deduplicated disk image; and transferring the requested at least one logical data unit to a recipient, wherein the portion of the at least one deduplicated disk image that corresponds to the at least one requested logical data unit is made up of one or more data blocks, wherein a file name of each data block is a hash value of the contents of each data block, and wherein a map file stores a name of each data block.

2. The method in accordance with claim 1, wherein at least one step is performed at least in part by a virtual filesystem component.

3. The method in accordance with claim 2, wherein the virtual filesystem component includes a Filesystem in Userspace (FUSE) driver which presents a mountable volume and interprets code in user space.

4. The method in accordance with claim 1, further comprising aggregating the at least one requested logical data unit into a container file.

5. The method in accordance with claim 4, further comprising providing a set of executable instructions in the container file that are configured to copy a logical data unit contained in the container file to a predetermined destination.

6. The method in accordance with claim 4, further comprising performing data compression of the at least one requested logical data unit.

7. The method in accordance with claim 1, wherein the received request for the at least one logical data unit is generated at least in part via a user interface.

8. The method in accordance with claim 1, wherein the received request for the at least one logical data unit is generated at least in part via an application programming interface.

9. A system for performing data restoration, comprising:
a processor;
a storage device operably coupled to the processor; and
a file-level access module including a set of instructions executable on the processor for performing a method of data restoration comprising:

receiving a request for at least one deduplicated disk image residing on a backup storage device;

identifying the at least one deduplicated disk image residing on the backup storage device based on information contained within an index file, which is indicative of a logical organization of the backup storage device;

mounting the at least one deduplicated disk image;

receiving a request for at least one logical data unit stored within the at least one deduplicated disk image;

identifying a portion of the at least one deduplicated disk image that corresponds to the at least one requested logical data unit without restoring the entire at least one deduplicated disk image;

restoring only the portion of the at least one deduplicated disk image; and transferring the at least one requested logical data unit to a recipient, wherein the portion of the at least one disk image that corresponds to the at least one requested logical data unit is made up of one or more data blocks, wherein a file name of each data block is a hash value of the contents of each data block, and wherein a map file stores a name of each data block.

10. The system in accordance with claim 9, further comprising a virtual filesystem component, wherein at least one step of the method of data restoration is performed at least in part by the virtual filesystem component.

11. The system in accordance with claim 10, wherein the virtual filesystem component includes a Filesystem in Userspace (FUSE) driver which presents a mountable volume and interprets code in user space.

12. The system in accordance with claim 9, wherein the file level access module includes the set of instructions performing the method of data restoration that further comprises aggregating the at least one requested logical data unit into a container file.

13. The system in accordance with claim 12, wherein the method of data restoration further comprises providing a set of executable instructions in the container file that are configured to copy a logical data unit contained in the container file to a predetermined destination.

14. The system in accordance with claim 9, wherein the file level access module includes the set of instructions performing the method of data restoration that further comprises performing data compression of the at least one requested logical data unit.

15. The system in accordance with claim 9, wherein the received request for the at least one logical data unit is generated at least in part via a user interface.

16. The system in accordance with claim 9, wherein the received request for the at least one logical data unit is generated at least in part via an application programming interface.

17. A non-transitory machine-readable medium comprising a set of instructions configured to perform a method for retrieving a logical data unit stored within a deduplicated disk image residing on a backup storage device without restoring the entire deduplicated disk image, the method comprising:

receiving a request for at least one deduplicated disk image residing on the backup storage device;

identifying the at least one deduplicated disk image residing on the backup storage device based on information contained within an index file, which is indicative of a logical organization of the backup storage device;

mounting the at least one deduplicated disk image;

receiving a request for at least one logical data unit stored within the at least one deduplicated disk image;

identifying a portion of the at least one deduplicated disk image that corresponds to the at least one requested logical data unit without restoring the entire at least one deduplicated disk image;

restoring only the portion of the at least one deduplicated disk image; and transferring the at least one requested logical data unit to a recipient, wherein the portion of the at least one deduplicated disk image that corresponds to the at least one requested logical data unit is made up of one or more data blocks, wherein a file name of each data block is a hash value of the contents of each data block, and wherein a map file stores a name of each data block.

18. The method in accordance with claim 1, wherein a first n bytes of the file name indicate a name of a first level directory and a second n bytes of the file name indicate a name of a second level directory, under the first level directory, where a data block identified by the file name is stored.

19. The system in accordance with claim 9, wherein a first n bytes of the file name indicate a name of a first level directory and a second n bytes of the file name indicate a name of a second level directory, under the first level directory, where a data block identified by the file name is stored.

20. The non-transitory machine-readable medium in accordance with claim 17, wherein a first n bytes of the file name indicate a name of a first level directory and a second n bytes of the file name indicate a name of a second level directory, under the first level directory, where a data block identified by the file name is stored.

21. The method in accordance with claim 1, wherein access to contents of the at least one deduplicated disk image is provided through a web interface.

22. The method in accordance with claim 1, wherein the at least one deduplicated disk image is mounted remotely using a network file system.

23. The system in accordance with claim 9, wherein access to contents of the at least one deduplicated disk image is provided through a web interface.

24. The non-transitory machine-readable medium in accordance with claim 17, wherein the at least one deduplicated disk image is mounted remotely using a network file system.

25. The method in accordance with claim 1, wherein the at least one deduplicated disk image is compressed.

26. The system in accordance with claim 9, wherein the at least one deduplicated disk image is compressed.

27. The non-transitory machine-readable medium in accordance with claim 17, wherein the at least one deduplicated disk image is compressed.

* * * * *